United States Patent [19]

Yano

[11] 4,078,854
[45] Mar. 14, 1978

[54] STEREO IMAGING SYSTEM

[75] Inventor: Akio Yano, Tokyo, Japan

[73] Assignee: Canon Kabushiki Kaisha, Tokyo, Japan

[21] Appl. No.: 630,455

[22] Filed: Nov. 10, 1975

Related U.S. Application Data

[63] Continuation of Ser. No. 518,157, Oct. 25, 1974, abandoned, which is a continuation of Ser. No. 399,626, Sep. 21, 1973, abandoned, which is a continuation of Ser. No. 293,934, Oct. 2, 1972, abandoned.

[30] Foreign Application Priority Data

Oct. 5, 1971    Japan .................................. 46-78206

[51] Int. Cl.² ............................................. G03B 21/60

[52] U.S. Cl. .................................... 350/128; 350/127; 350/130; 353/7; 353/10

[58] Field of Search ............... 350/128, 127, 117, 130, 350/131, 144; 354/120; 352/86; 353/7, 10

[56] References Cited

U.S. PATENT DOCUMENTS 3,688,045   8/1972   Ohkoshi .......................... 350/131 X Primary Examiner—Richard L. Moses
Attorney, Agent, or Firm—Toren, McGeady and Stanger

[57] ABSTRACT

A stereo image projection system in which one or a plurality of original pictures are projected onto a plate-shaped optical element. The element changes an incident beam to a beam of prescribed shape with a diffusion angle of more than 10° in one direction and with a diffusion angle of less than 20° in another direction perpendicular to the one direction.

20 Claims, 8 Drawing Figures

STEREO IMAGING SYSTEM

This is a continuation of application Ser. No. 518,157, filed Oct. 25, 1974, which in turn was a continuation of application Ser. No. 399,626, filed on Sept. 21, 1973, which in turn was a continuation of application Ser. No. 293,934, filed Oct. 2, 1972. All of which are now abandoned.

This invention relates to a stereo picture image projector system, and more specifically to a system for producing a stereoscopic image in wide range from a small number of original pictures.

In case of projecting of stereo images, in general, plural picture images (original picture for stereo) photographed from different visual angles are used. Each shows separate picture images to right and left eyes, thus producing a system in which a stereoscopic image is effected by the parallax of both eyes.

There are various factors other than the parallax of the eyes, achieving the effect of stereo images. In case, an ordinary object is recorded as a plane picture, the sizes, overlappings, shadows etc, contribute to the depth feelings in the picture. Even in a plane picture, the stereo feeling may be enhanced by enlarging its size considerably such as making it appear to be an aerial image.

Conventional projection methods using the parallax of both eyes, are provided, for instance, where two originals for stereo are respectively covered with a polaroid filter having an orthogonal component and being projected on a screen. The screen is seen through polaroid spectacles, another method employs a number of original pictures for stereo projected onto a screen for stereo, which is observed by a person located near said projector. Fairly good stereos may be obtained by such methods. However, in the former system a drawback is that it requires spectacles even though stereoscopic vision is possible over a wide range, while in the latter system, the range is determined by the number of original picture (i.e. the number of projectors), so that a very large numbers of original pictures must be projected to produce stereoscopic vision over a wide range.

An object of this invention is to obtain a wide range of stereoscopic vision by combining skillfully the parallax of both eyes with other factors for stereo vision and by projecting a small number of original pictures for producing a stereo image.

Other and more specific objects, features and advantages of the invention will appear from the detailed description given below in conjunction with accompanying drawings which form a part of this specification and illustrate by way of example some preferred embodiments of the invention. In the drawings.

Figure 1:
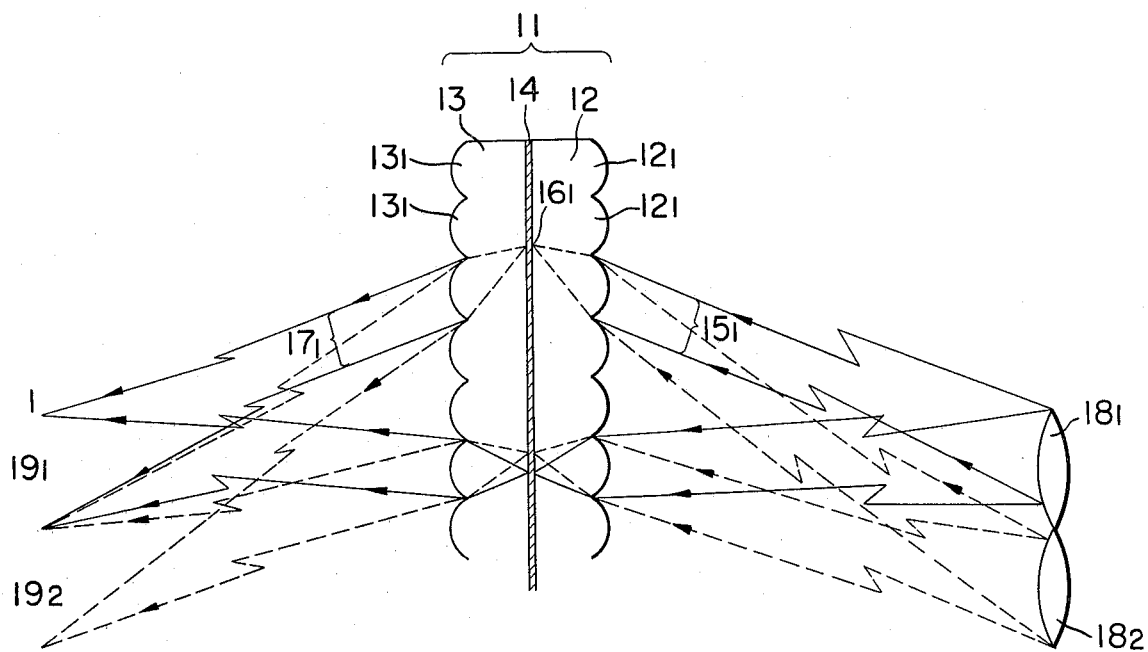
FIG. 1 is an explanatory drawing of a usual lenticular stereo screen.

First, an ordinary transmission type lenticular stereo screen 11 is explained with reference to FIG. 1. The transmission type lenticular stereo screen is composed of minute cylindrical lenticular lenses 13, 13 — $13_1$, $13_1$ — closely arranged to form lenticular plates 12 and 13, between which a diffusion plate 14 is provided. The function of this screen is explained as follows.

The light flux $15_1$ entering a cylindrical lenticular lens $12_1$ is considered to approximate parallel rays because of the lens being small, so that a fine linear image is formed on the diffusion plate 14, which is located on a focal plane behind the lenticular lens. (In practice, the thickness of lenticular lens $12_1$ is selected equal to the effective focal distance and the diffusion plate 14 is located in contact with the lenticular plate 12). The diffusion ray from this linear image is changed to a nearly parallel light flux $17_1$ by the other minute cylindrical lenticular lens $13_1$ of equal pitch located back to back with the lenticular lens $12_1$, and is projected in a direction which is symmetrical with respect to the diffusion plane 14 and relative to the incident direction. Since the same relation is effective about the light flux incident on other numbers of lenticular lenses $12_1$, $12_1$ —, one observing area $19_1$ is formed for one projecting lens $18_1$. To produce stereoscopic vision, the original picture for stereo is projected by at least one other projection lens $18_2$ to produce another observing area $19_2$, and the observation is effected by setting the right and left eyes respectively on the locations of these observing area $19_1$ and $19_2$. In such an ordinary transmission type lenticular stereo screen, the width of observing area must be smaller than the distance between the eyes, so that large numbers of original pictures must be projected. But at the same time, attention must be paid not to produce any area mixed with these observing areas. Since the lenticular stereo screen 11 has no refractive power in the perpendicular section in FIG. 1 (a plane perpendicular to the plane of drawing), the ray from the diffusion plate is diffused as it is. In other words, the diffusion area is largely spread in this plane.

Figure 2:
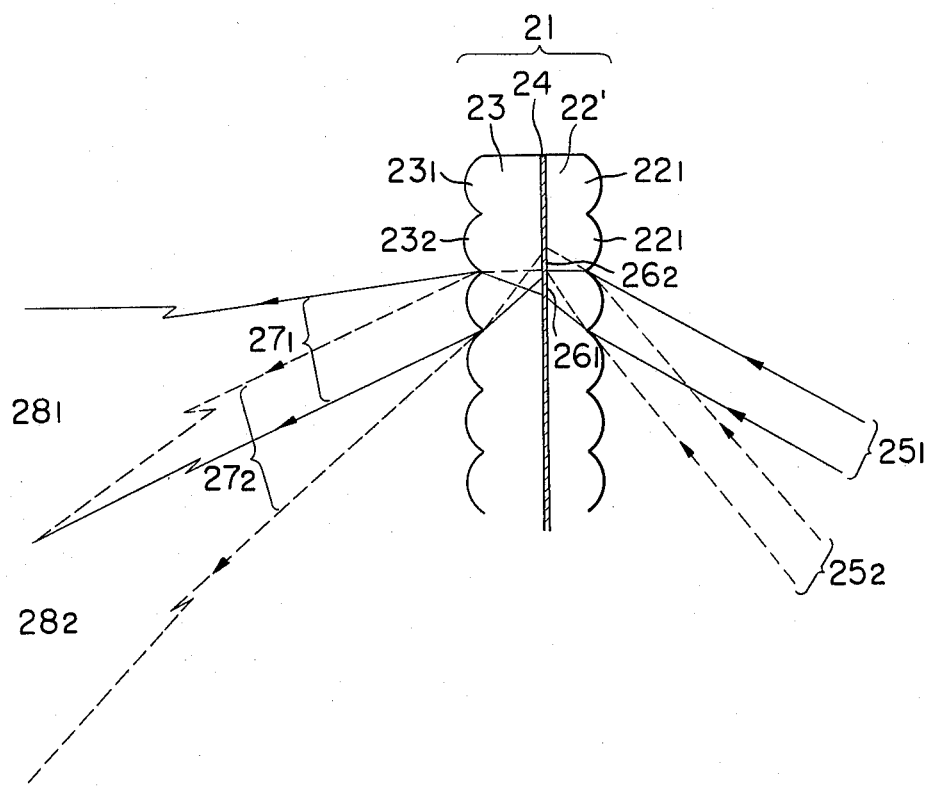
FIG. 2 is an illustrative view of a lenticular screen used in this invention.

FIG. 2 shows a transmission type lenticular screen 21, which is formed of plate-shaped intermediate optical elements used in this invention, wherein a diffusion plate 24 is provided between two sheets of lenticular plates 22, 23, having almost same construction as shown in FIG. 1. Each of the minute cylindrical lenticular lenses $22_1$, $22_1$ — which form the lenticular plate 22' is arranged in such a manner that the incident light flux $25_1$ forms as a linear image $26_1$ having a certain width on the diffusion plate 24. In practice, the thickness of lenticular lens is selected either larger or smaller than the effective focal distance, and the diffusion plate 24 is located in contact with this lenticular plate. In like manner, the incident light flux $25_2$ from the other direction forms a linear image $26_2$ on the diffusion plate. However, the diffusing rays from these images $26_1$, $26_2$ are projected each in different directions $27_1$, $27_2$ by means of the minute cylindrical lenticular lenses $23_1$, $23_1$ — having the thickness equal to the effective focal distance, with less than 20° of diffusion angle in the horizontal direction, preferably about 10°, and more than 10° of diffusion angle in vertical direction, preferably about 20°–30°. Similarly, the incident light into the other lenticular lens is projected in a direction which is determined by the shape of the lens, resulting in forming observing areas $28_1$, $28_2$. These formed observing areas $28_1$, $28_2$ become fairly wide and are adjacent to each other without any separation, compared with the observing areas $19_1$, $19_2$ in FIG. 1. The area of one of these observing areas is determined by the thickness of lenticular lens $22_1$, and by changing this thickness, desired plural observing areas may be produced. In a section perpendicular to FIG. 2 (a plane perpendicular to the paper), the ray will only diffuse as in the case of FIG. 1, so that a wide observing area may be obtained in such a direction.

Figure 3:
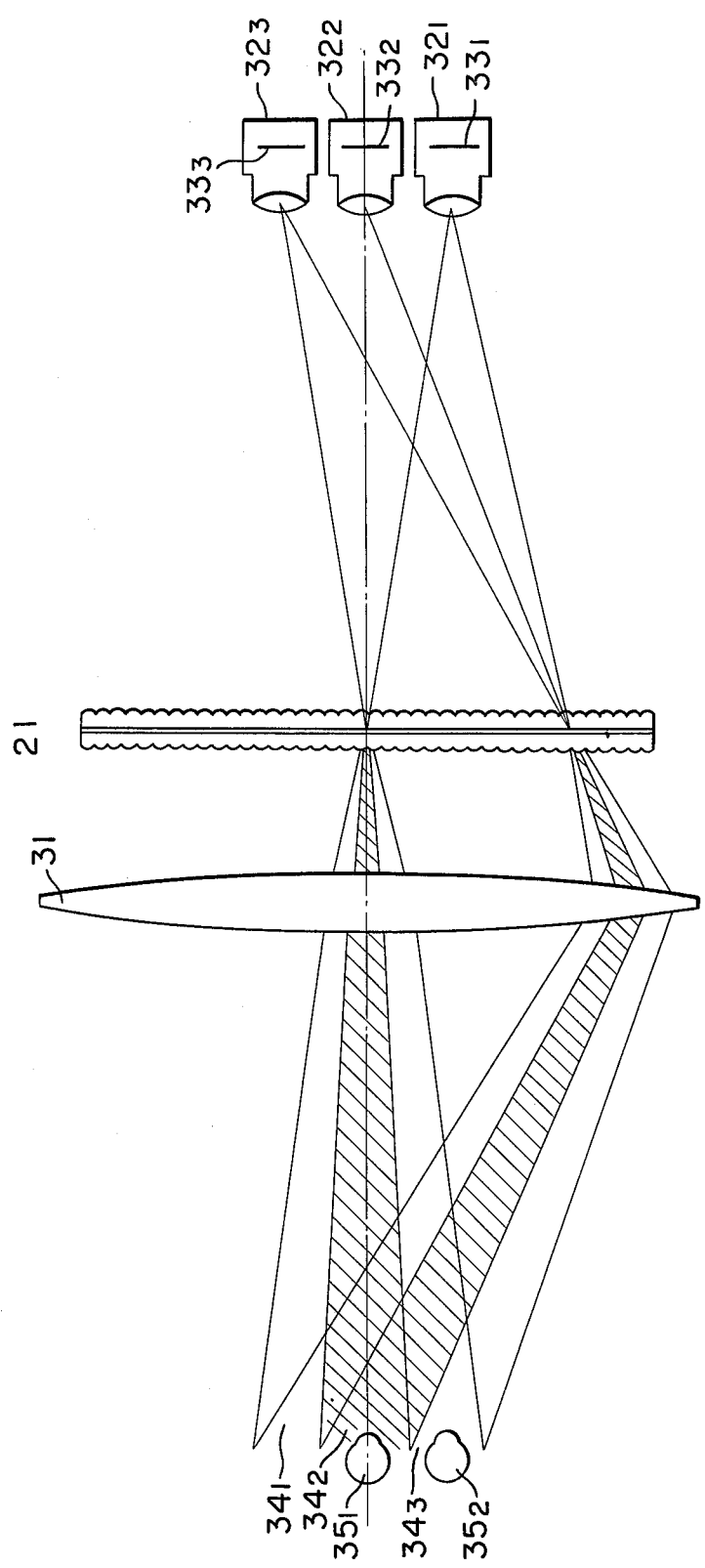
FIG. 3 is an illustrative view of an embodiment of this invention.

The first embodiment of this invention is shown in FIG. 3, wherein a plate-shaped lenticular screen 21 is used in such a manner that said incident angles are changed to a fixed shape in one direction with more than 10° of diffusion angle and in another direction with less than 20° of diffusion angle.

In the figure, 31 denotes a large convex lens (for instance, Fresnel lens), $32_1$, $32_2$, $32_3$ are projectors, $33_1$, $33_2$, $33_3$ are original pictures, wherein the same object is photographed with a fixed parallax, 21 is a transmission type lenticular screen shown in FIG. 2 and located within the front focal distance of the convex lens 31. Terminals $34_1$, $34_2$, $34_3$ denote observing areas, $35_1$, $35_2$ are right and left eyes of the observer.

The function of this device will be explained.

The lights passed through the original pictures $33_1$, $33_2$, $33_3$ are projected on the lenticular screen 21 for image formation by means of projectors $32_1$, $32_2$, $32_3$, then are incident on observing areas $34_1$, $34_2$, $34_3$ through the convex lens 31. These observing areas $34_1$, $34_2$, $34_3$ will become reduced, which are the area merely obtained by the lenticular screen 21 multiplied by the magnification of the lens 31. When the right and left eyes of the observer are located in the observing areas $34_1$ and $34_2$, or $34_2$ and $34_3$, stereo vision may be effected by the parallax effect of both eyes. When both eyes of the observer are located, for instance, in the observing area $34_1$ only, the parallax factor of both eyes does not act thereon, however, stereoscopic vision will be effected by the other factors. In this case, besides the factors of stereoscopic vision size, shadow, overlap, which are possessed by the plane picture image itself, a feeling of stereo is obtained by the fact that the image on the lenticular screen appear behind the surface of the convex lens as a virtual image enlarged by the magnifying effect of the lens. The existence of the lenticular screen itself is hardly recognized because of the virtual image, and a similar effect to the parallax of both eyes is produced because of the distortion seen by the right and left eyes being slightly different, when a lens having larger distortion such as Fresnel lens is used as the convex lens.

Figure 4:
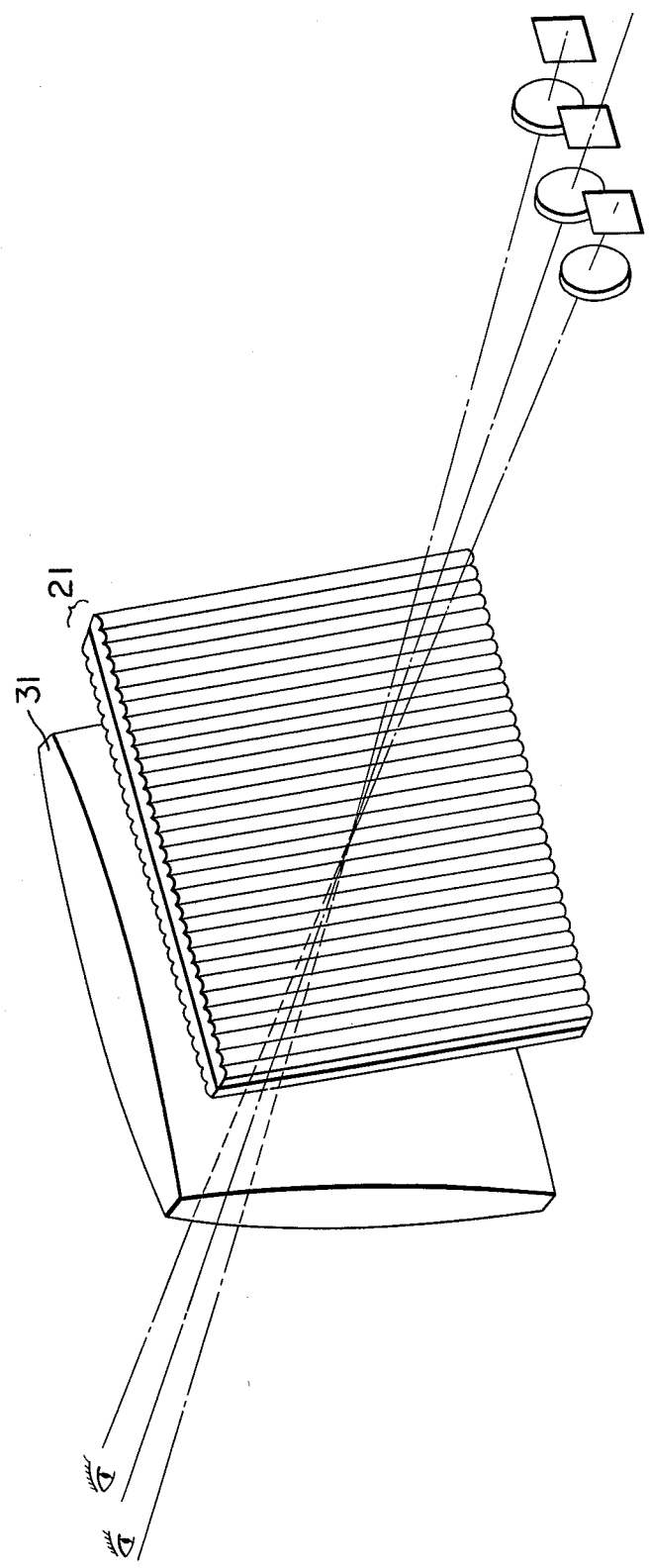
FIG. 4 is a view of a second embodiment thereof.

FIG. 4 shows a second embodiment of this invention, wherein the lenticular screen 21 is inclined against the surface of convex lens 31. In such a manner, the more distant part from the side of lens will be enlarged more, however, when an ordinary object is considered, the near view is larger and the distant view is smaller. Therefore, if an inclination is given so as to keep the part of near view at a distance from the side of the lens, the perspective will be increased. Generally, the near view will come to the underside, so that it is better to incline the screen as shown in FIG. 4, In the ordinary case, the inclination from the vertical surface is about 20°, but according to its scene, it is suitably selected in a range of ± 3° ∼ ± 50° (negative sign means referring to incline the upper side kept away from lens surface).

Figure 5:
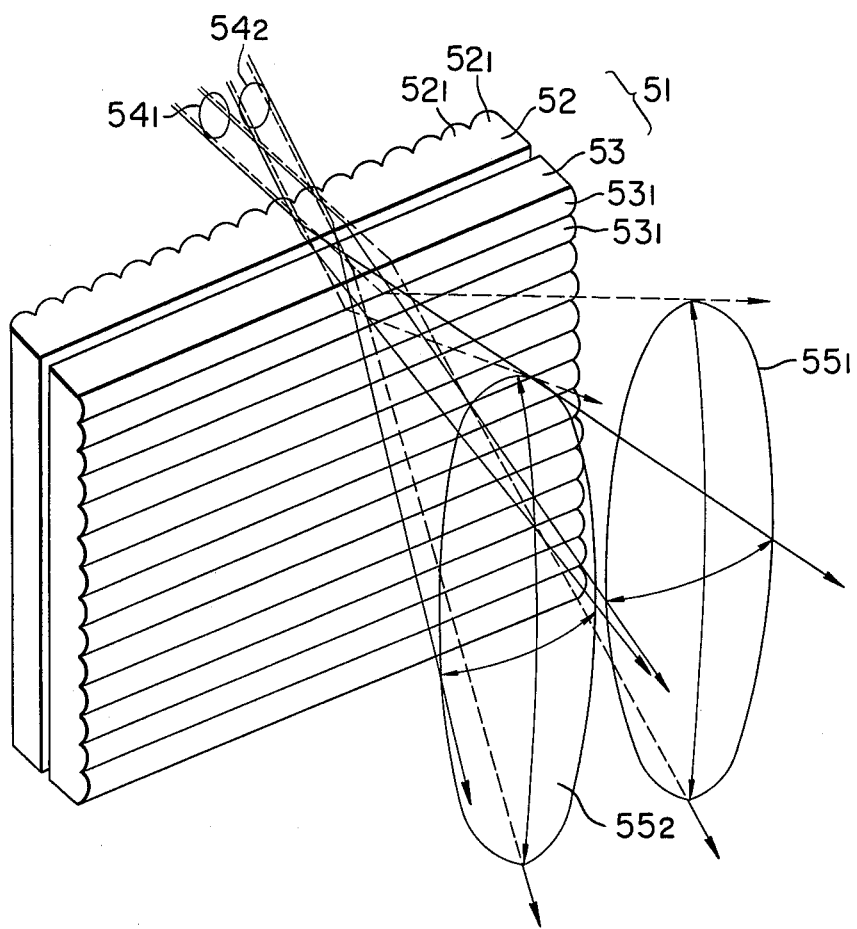
FIG. 5 is a view of an orthogonal lenticular plate used in this invention.

Next, in FIG. 5, an orthogonal lenticular plate 51, which is another embodiment of the plate-shaped intermediate optical element used in the third and the fourth embodiments of this invention, is shown. The orthogonal lenticular plate 51 is a combination of lenticular plates 52 and 53, comprising minute cylindrical lenticular lenses $52_1$, $52_1$ — and $53_1$, $53_1$ — arranged closely and in parallel, and are arranged in such a manner that the directions of bus lines of each lenticular lens intersect at right angles. This orthogonal lenticular plate works to diffuse the incident beam in every direction with limited angles, and in FIG. 5, the incident beams $54_1$, $54_2$ will spread as the areas $55_1$, $55_2$ after passing through the orthogonal lenticular plate 51. The diffusion angles of each beams will be determined only by the focal distance and pitch (i.e. F number) of each minute cylindrical lenticular lenses $52_1$ —, $53_1$ —. By changing the F numbers of lenticular lens $53_1$, $53_1$, the upper and lower diffusion angles are changed. This orthogonal lenticular plate 51 for stereoscopic vision widely diffuses the incident beam in the longitudinal direction by more than 10°, preferably 20°- 30°, and in lateral direction by less than 20°, preferably about 10°. In practice, the diffusion angles, i.e. open angles, will be determined according to the desired stereoscopic vision areas. The orientation (inside and outside) of the orthogonal lenticular plate may be arranged in any way, and two sheets of lenticular plates may be formed in one body, unifying inside and outside.

Figure 6:
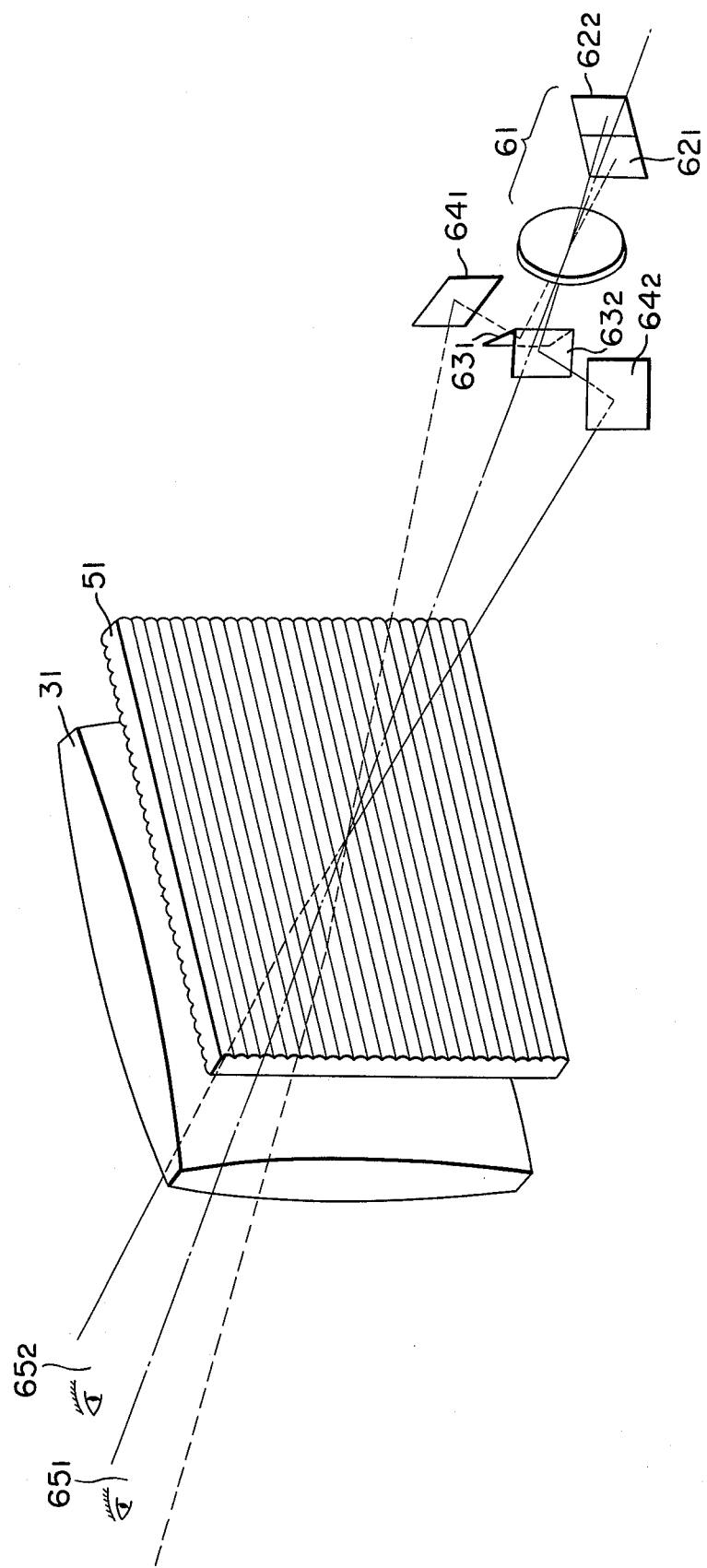
FIGS. 6–8 are illustrative views of the third, fourth and fifth embodiments of this invention, respectively.

FIG. 6 shows the third embodiment of this invention, wherein an orthogonal lenticular plate 51 is used. Number 31 denotes a large convex lens, 61 is a projector, $62_1$ and $62_2$ are original pictures for stereo, $63_1$, $63_2$, $64_1$, $64_2$ are reflection mirrors, 51 is an orthogonal lenticular plate (unified in one body), which is located within the front focal distance of the convex lens, as in FIG. 3.

In this device, the light passed through the original pictures $62_1$, $62_2$ is projected on the orthogonal lenticular plate by the projector, through the reflection mirrors $63_1$, $63_2$, $64_1$, $64_2$, when the information of the original pictures $62_1$, $62_2$ of right and left are passed respectively through separate reflection mirrors $63_1$, $64_1$, $63_2$, $64_2$. The rays reflected by these mirrors are made incident according to the nature of the orthogonal lenticular plate into the observing areas $65_1$, $65_2$, so that if the right and left eyes are respectively located in these two areas, stereoscopic vision due to the parallax of both eyes becomes possible, and even when both eyes are located in one area, stereoscopic vision is obtained as in FIG. 3. In FIG. 6, there is shown how to fit the attachment to one projector; however, it is available when plural projectors are used.

In case each of the original picture films $62_1$, $62_2$ is an inverted image of right and left compared with the object, one more reflection mirror is the respectively increased for respective light flux for right and left eyes, besides the mirrors $63_1$, $63_2$, $64_1$, $64_2$.

Figure 7:
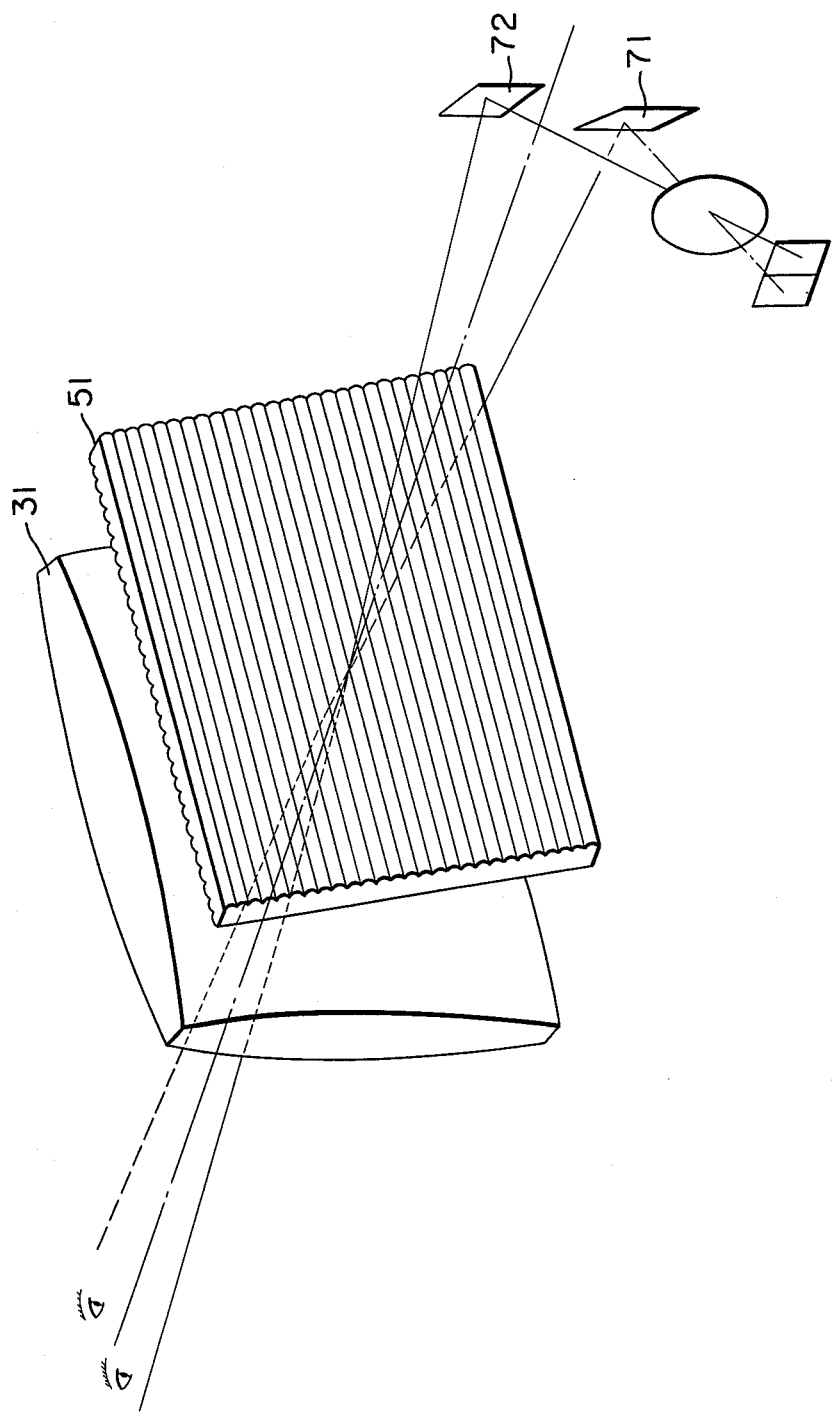

FIG. 7 shows the fourth embodiment of this invention, wherein an increased stereo effect may be achieved by inclining the orthogonal lenticular plate, as in the case of FIG. 4 in the embodiment shown in FIG. 6. To separate and project and right and left original pictures, reflection mirrors 71, 72 intersecting each other with a certain angle are used, but the orientation of right and left of the original picture is inverted with that of FIG. 6. This embodiment is available for an indication device for a plane picture image, only when two reflection mirrors are made parallel.

Figure 8:
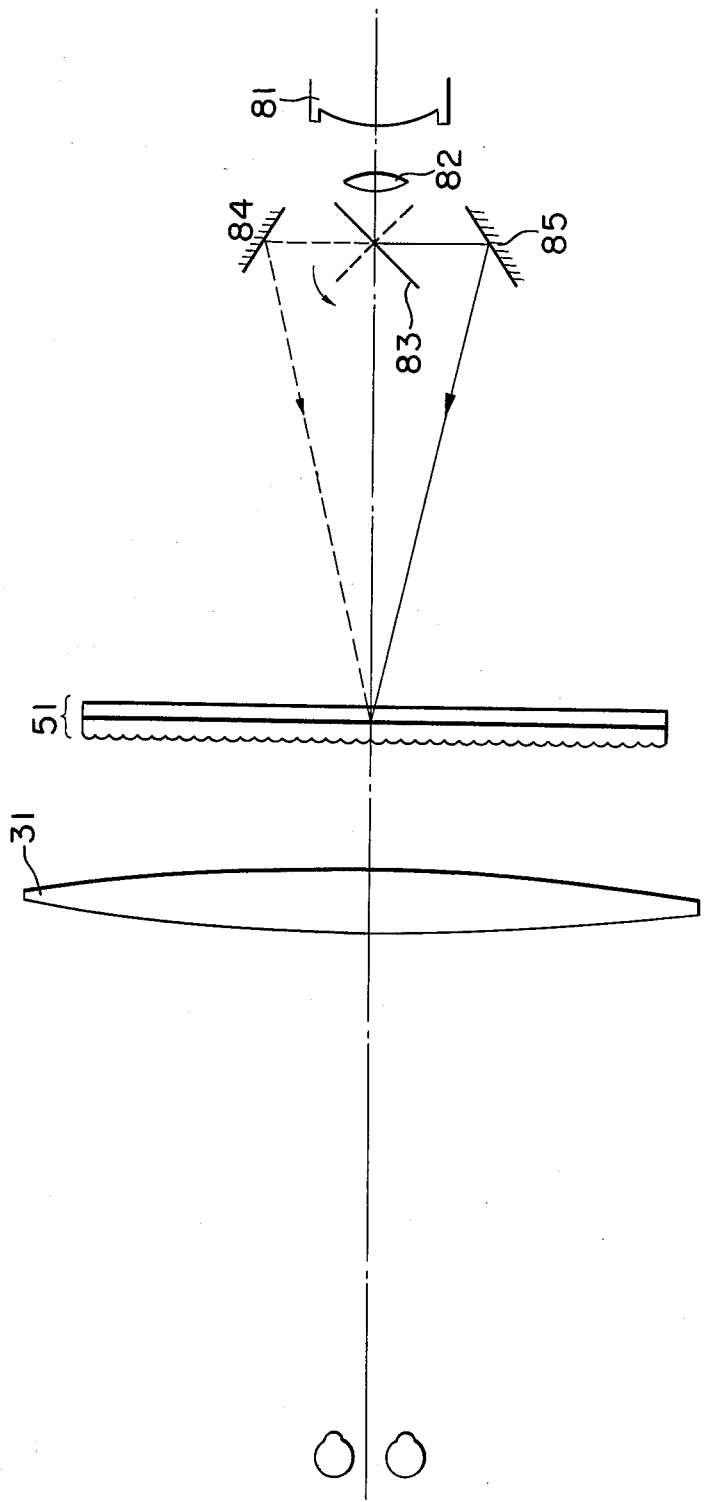

FIG. 8 shows the fifth embodiment of this invention, which indicates the image of the original picture for stereo in a time division system. The system employs a rotary reflection mirror 83 and a cathode-ray tube 81, instead of the reflection mirrors 63₁, 63₂ and a projector 61 in the embodiment shown in FIG. 6.

In this device, the original picture images of right and left are indicated one after the other on the cathode-ray tube, and the reflection mirror 83 is rotated corresponding thereto, of which images are projected by the lens 82 onto the orthogonal lenticular plate 51 through another reflection mirror 84 or 85. In place of the cathode-ray tube 81, a light valve of Schlieren type, such as "eyed hole", may be used. This embodiment is applicable to an original picture for stereo recorded on an ordinary long film. Further, it may be used for an indicating device other than a stereo picture image, if the reflection mirror 83 is removed from the light path by means of suitable device.

In the above mentioned embodiments, it is clear that the concave lens may be used instead of the convex lens. Further, the original picture for stereo may be recorded on any device, for which the hologram and the electrostatic photograph and the like are considered, besides the above mentioned ones.

As mentioned above, in this invention, there is provided within the focal distance of an image formation optical system, a plate-shaped optical element which will change the incident beam to a beam having a fixed shape, with a diffusion angle of more than 10° in one direction and a diffusion angle of less than 20° in another direction, so that a stereoscopic vision may be effected over a wide range from a small number of original pictures five sheets maximum. A stereo image projection device for moving pictures by means of two sheets of original pictures may be constructed simply. In the experiments, a moving picture camera is fitted with an attachment having the same construction as the reflection mirrors 51, 52 shown in FIG. 6, wherein one coma of the film is separated in two and right and left original pictures for stereo are photographed, then a stereo image is indicated according to the embodiment shown in FIG. 7. Thus, a favorable result has been obtained.

In this invention, a bright image may be observed, because the image forming optical system of convex lens (or concave mirror) and the like serves to condense rays. Particularly, the orthogonal lenticular plate may optionally change the diffusion angles in every direction according to its design, so that larger quantities of light may be used effectively.

What is claimed is:

1. A stereo imaging system, comprising: a plate-shaped optical element, a convergent optical system; said element being disposed within the focal distance of the optical system for converting an incident beam into a beam of prescribed shape when one or more pictures are projected onto said plate-shaped optical element, the plate-shaped optical element being composed of two lenticular sheets each having a plurality of parallel cylindrical lenses.

2. A system according to claim 1 in which the plate-shaped optical element forms a screen and further comprising means for projecting stereo images on the screen.

3. A system as in claim 1 in which the optical system is composed of Fresnel lens.

4. A system according to claim 1, in which the cylindrical lenses of each sheet are at right angles to the cylindrical lenses of the other sheet.

5. A system according to claim 1, in which the plate-shaped optical element includes a layer which diffuses light between the two lenticular lens sheets.

6. A system according to claim 1, in which, the lenses of each lenticular sheet have equal pitches.

7. A stereoptic image display system comprising:
a screen having two lenticular sheets arranged to enlarge an incident beam by increasing its divergence by 20° or less in a parallax direction and by 10° or more in a direction transverse to parallax and beam directions, and
an optical system for causing convergence of beams in all directions, said optical system having a focal point, said screen being positioned in said focal point.

8. The system as in claim 7, in which said optical system is a convex mirror system.

9. The system as in claim 7, in which said optical system is a concave mirror system.

10. A system as in claim 1, wherein the sheets each have flat backs and the sheets are arranged back to back.

11. The system in claim 7, in which said screen is a screen including a diffusion plate and means for cementing the plate between the two lenticular sheets.

12. A system as in claim 10, wherein the sheets each include cylindrical lenses and the lenses of the two sheets are parallel.

13. The system described in claim 7 in which the two lenticular sheets each include cylindrical lenses and the cylindrical lenses of each sheet are transverse to the lenses of the other sheet.

14. The system described in claim 7, in which the axis of the screen is inclined relative to the axis of the optical system.

15. A system as in claim 7, further comprising: means to project an image along separate beams having parallax information onto the screen.

16. A system as in claim 8, further comprising: means to project an image along separate beams having parallax information onto the screen.

17. A system as in claim 9, further comprising means to project an image along separate beams having parallax information onto the screen.

18. A system as in claim 10, further comprising, means to project an image along separate beams having parallax information onto the screen.

19. A system according to claim 11, further comprising, means to project an image along separate beams having parallax information onto the screen.

20. A system as in claim 19, wherein the diffusion plate is outside the focal distances of the cylindrical lenses of one of the plates and within the focal distance of the cylindrical lenses in the other plate.

* * * * *